April 30, 1957

J. H. BORNZIN 2,790,336

TRIP MECHANISM FOR HAY BALERS INSURING
RELATIVE UNIFORM LENGTH BALES

Filed Sept. 29, 1953

INVENTOR.
James H. Bornzin
Paul O. Pippel
Atty

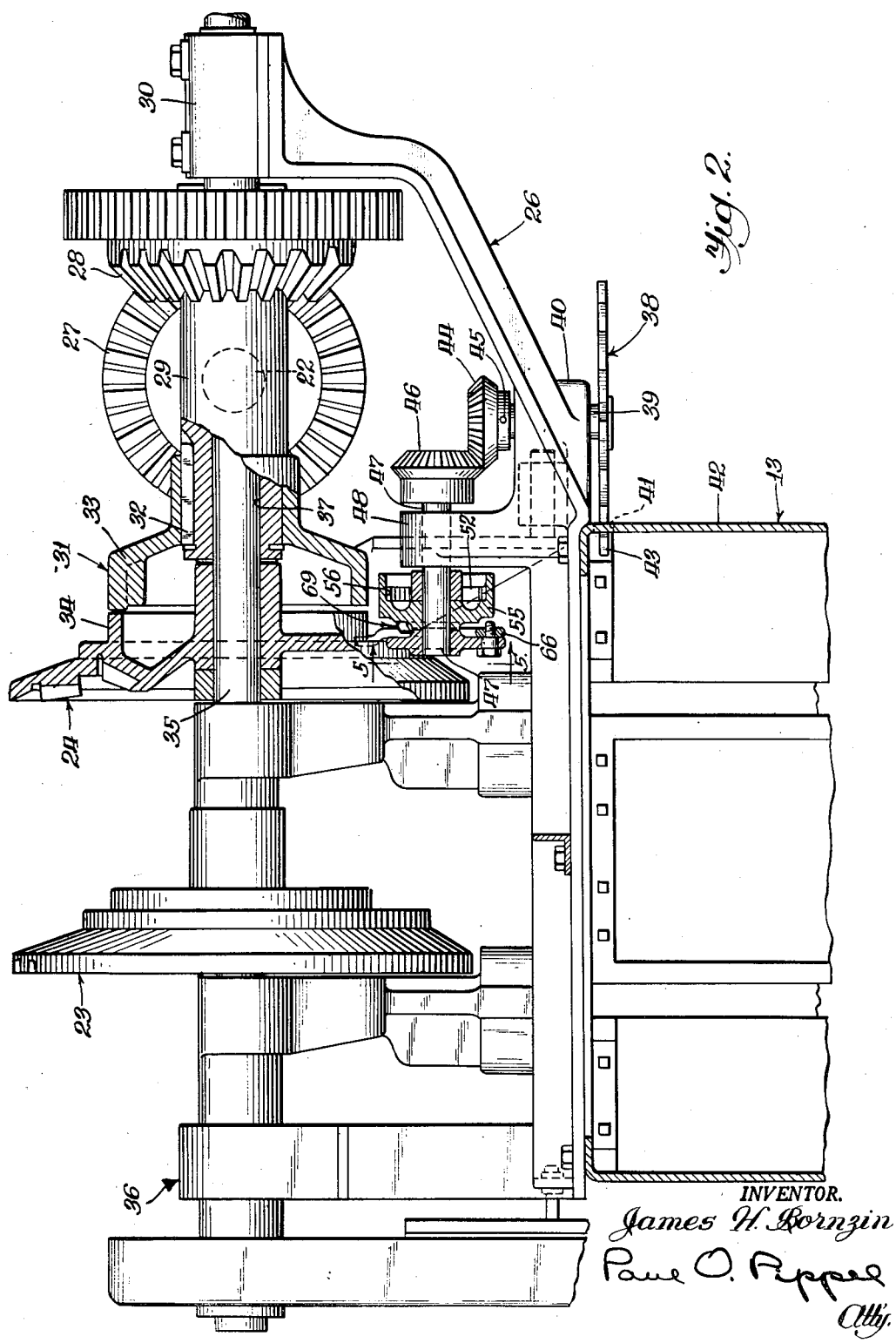

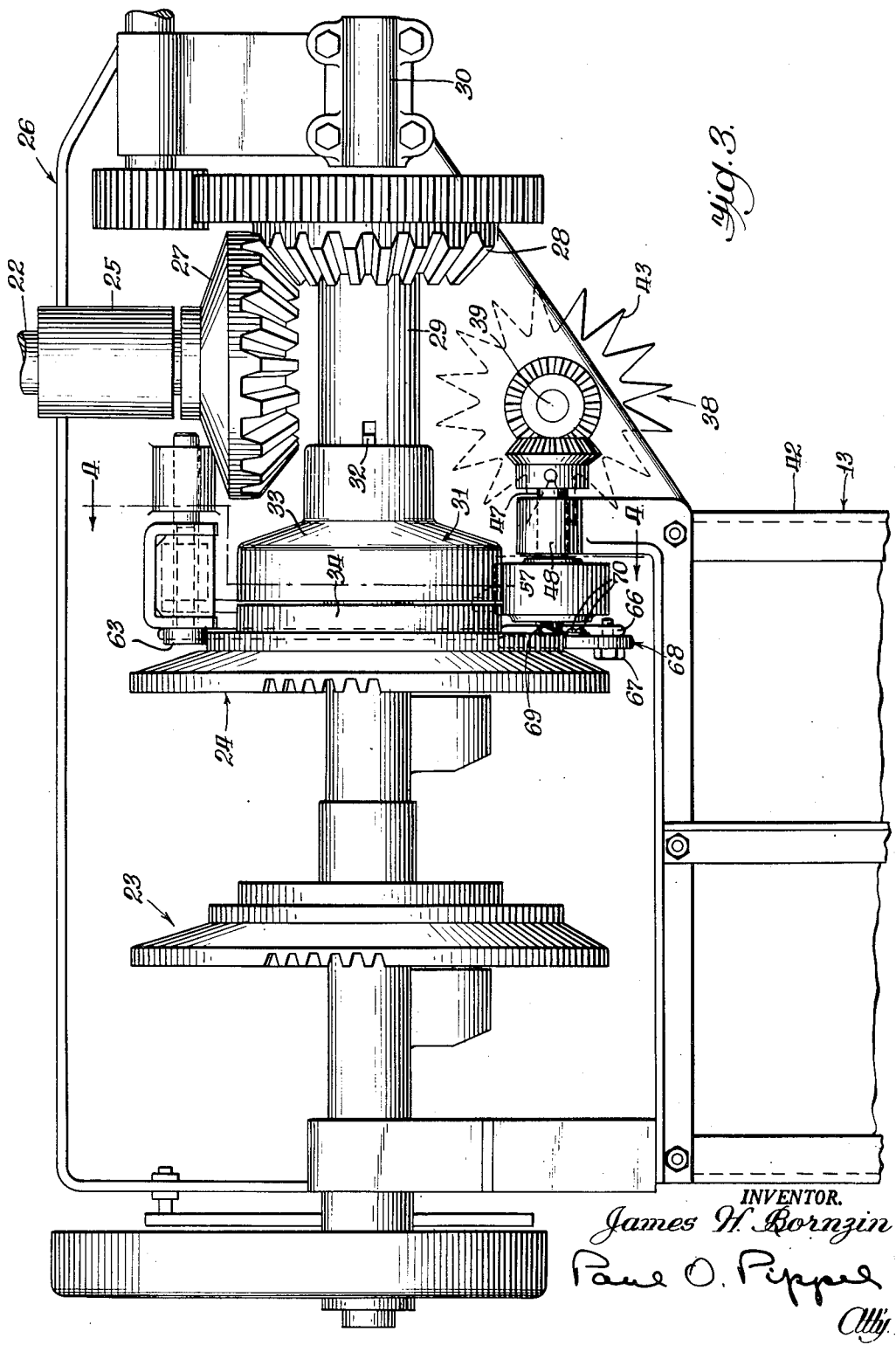

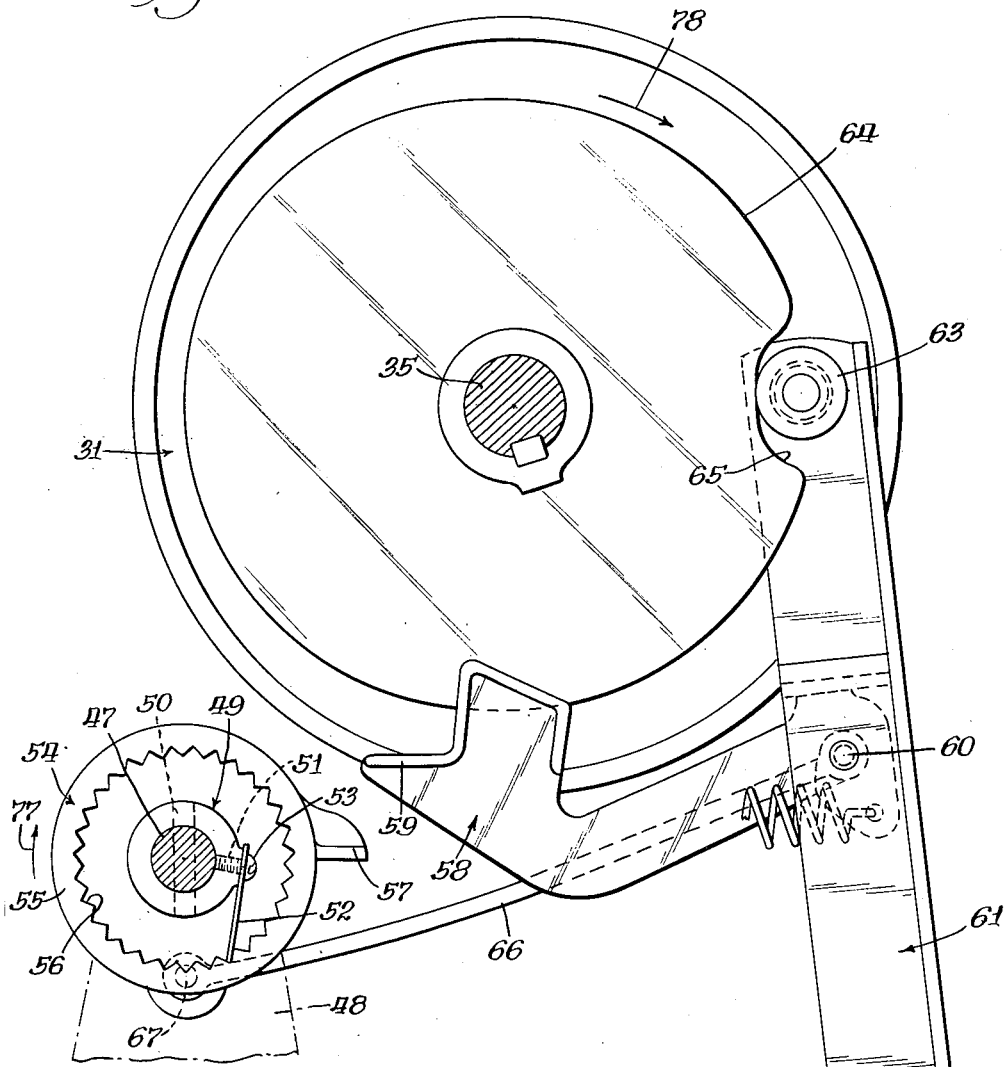

United States Patent Office 2,790,336
Patented Apr. 30, 1957

2,790,336

TRIP MECHANISM FOR HAY BALERS INSURING RELATIVE UNIFORM LENGTH BALES

James H. Bornzin, Memphis, Tenn., assignor to International Harvester Company, a corporation of New Jersey Application September 29, 1953, Serial No. 383,076

1 Claim. (Cl. 74—665)

This invention relates to a new and improved trip mechanism for hay balers insuring relative uniform length bales.

The majority of present day hay balers employ a system wherein hay is picked up from a windrow and fed into a bale forming chamber when a bale compressing plunger is reciprocating within the bale forming chamber. In view of the reciprocation of the compressing plunger, it is necessary, of course, to feed the hay into the chamber at a time when the plunger is withdrawn whereafter that particular quantity of hay which has been fed to the chamber is compressed into bale formation. Each of these quantities of hay that are so compressed are termed variously "charges" and/or "slices." Each bale which is formed is composed of a number of slices or charges. The determination of the length of a bale is made by what the industry terms a star metering wheel. This star metering wheel engages the hay which has been compressed by the plunger and is rotated by reason of the longitudinal movement of the compressed hay therepast. The star metering wheel is geared to a trip finger which trips the clutch mechanism of the bale tying mechanism. Even with this method of controlling the length of hay bales there is considerable variation in bale lengths because of the various sizes of charges of hay as determined by the irregular density of the hay in windrows. The trip finger must rotate a complete revolution prior to its actuation of the bale tying means but in the event the trip finger was almost at its trip position just prior to the last charge and the last charge was relatively large, that particular bale would be especially long and the trip finger would be moved substantially past its starting point, thus making the succeeding bale substantially shorter in length than the first bale. It is thus an object of this invention to minimize bale length variation.

The principal object of this invention is to provide a trip for the tying mechanism of a hay baler which will automatically compensate for the various sizes of charges of hay delivered to the bale forming machine.

An important object of this invention is the provision of means in a hay baler wherein the bale length metering wheel is automatically reindexed to the same starting position upon the completion of each bale.

Another important object of this invention is to supply a metering wheel for actuating the trip mechanism in a hay baler and wherein there is mechanism positioned intermediate the metering wheel and the trip finger for maintaining the metering wheel operable to measure the length of bales throughout a complete length of one revolution of the trip finger upon the formation of each bale regardless of the quantity of hay fed to the bale chamber and the last charge thereof immediately preceding the tripping of the tie mechanism.

Other and further important objects and advantages will become apparent from the disclosures in the following specification and accompanying drawings.

In the drawings:

Figure 2 is an elevational view with parts thereof shown in section and taken on the line 2—2 of Figure 1;

Figure 3 is a top plan view of the device as shown in Figure 2;

Figure 4 is a sectional view taken on the line 4—4 of Figure 3;

Figure 5 is an enlarged elevational view with parts thereof broken away as taken on the line 5—5 of Figure 2; and Figure 6 is a detailed sectional view of a portion of the device as shown in Figure 5 and as taken on the line 6—6 of Figure 5.

As shown in the drawings:

Figure 1:
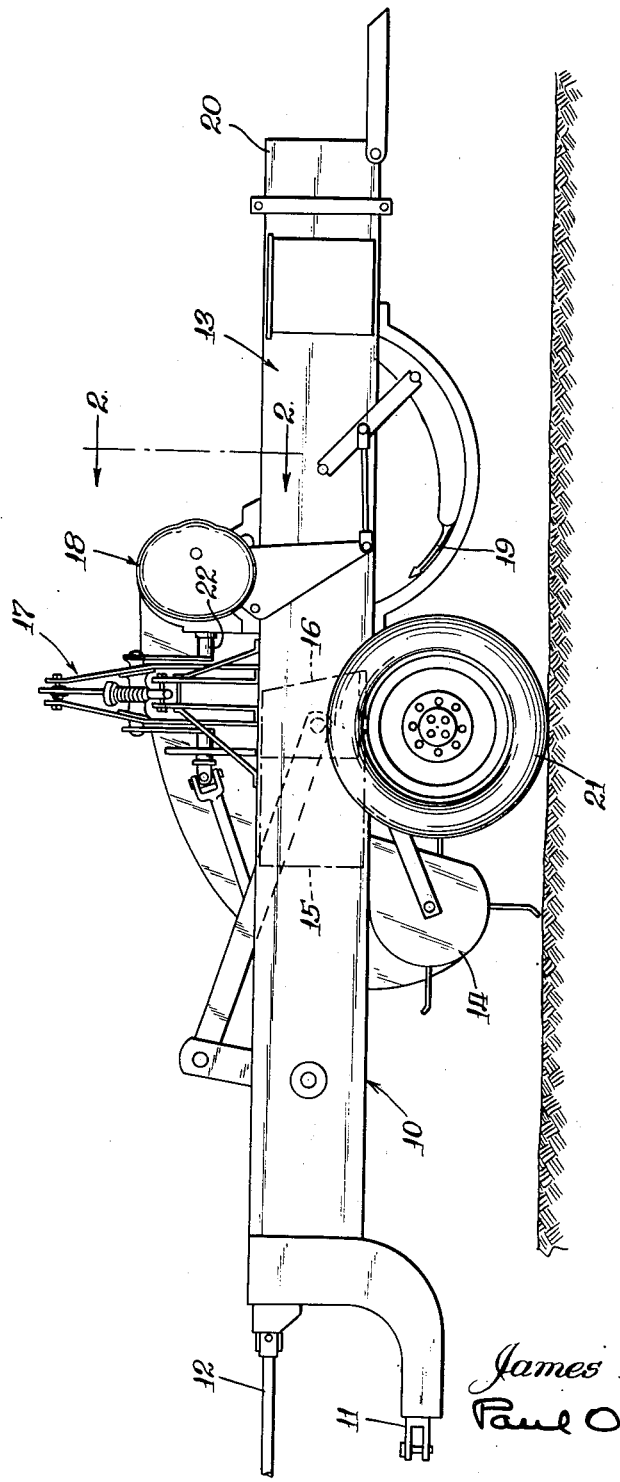
Figure 1 is a side elevational view of a hay baler incorporating the present invention.

The reference numeral 10 indicates generally a hay baling machine which is employed to traverse a field in which hay has been previously windrowed and thereupon pick up the windrowed hay and compress it into bales after which the bales are tied and thence discharged from the machine. The baler as shown in Figure 1 includes a forwardly disposed portion 11 in the form of a clevis which may be attached to the drawbar of a tractor for pulling thereof. The elements on the hay baler to be driven either receive their power from an auxiliary engine or a tractor power take off. In the present instance a tractor power take off shaft 12 is shown delivering rotative power rearwardly into the hay baler 10. The baler primarily includes a longitudinally disposed bale forming chamber 13 with a laterally disposed hay pickup 14 extending to one side of the elongated bale chamber 13. Hay picked up by the pickup 14 is delivered through a vertical opening 15 in the side wall of the elongated chamber 13, and with the aid of a reciprocating plunger 16 hay fed through the opening 15 is compressed in a rearward direction within the bale chamber 13. A packer finger means 17 is disposed on top of the bale chamber 13 and is arranged and constructed to carry the hay from the pickup 14 into and through the opening 15 in the bale chamber. The general construction of a baler of this type is more fully shown in the Crumb et al. Patent 2,450,082.

Following the compression of hay within the bale chamber 13 and after the quantity of hay so compressed attains some predetermined length, a tying mechanism 18 is actuated whereupon twine or wire carrying needles 19 cause the encircling of the compressed hay with a tie strand and effect a knotting of the ends thereof. Following the tying of the bales they are permitted to be discharged from a rearward discharge opening 20 in the end of the bale forming chamber 13. The hay baling machine 10 of this invention is carried on a wheeled support 21.

It will be apparent from the top plan view in Figure 3 that drive from the power take off shaft 12 is delivered to a longitudinally extending shaft 22 which is employed to deliver rotational drive to the knotter mechanism 18. The knotter mechanism details are not shown in these drawings other than the showing of the enlarged ring gears 23 and 24 which cause their operation. The drive shaft 22 is rotating constantly but this drive is only delivered at certain required intervals to the ring gears 23 and 24, and hence there is a clutch means interposed between these elements which is actuatable by the accumulation of a predetermined quantity of compressed hay within the bale forming chamber. The structure necessary to accomplish these past named functions is clearly shown in my prior Patent 2,634,840 and only those parts which are necessary to show environment for the present invention are included in this application.

The shaft 22 is journally supported in a sleeve bearing 25 which is fixedly mounted on a frame supporting structure generally designated by the numeral 26. A bevel gear 27 is affixed to one end of the shaft 22 and engages with and imparts drive to a bevel gear 28 disposed at right angles thereto. The bevel gear 28 is fastened to a shaft 29 in the form a sleeve and thus delivers drive to that shaft for the operation of the knotting mechanism. The sleeve shaft 29 is journally supported in a pillow block bearing or the like 30 mounted on the frame supporting structure 22. The other end of the sleeve 29 enters into a clutch mechanism 31. As best shown in Figure 2 the slevee 29 is provided with a key means 32, thus causing a bell-like clutch housing 33 to rotate simultaneously with rotation of the driven shaft 29. A complementary clutch part is shown at 34 as an integral part of the back side of the ring gear 24. As heretofore explained, the operating details of the clutch 31 and its cooperative clutch part 34 are not shown in the present drawings inasmuch as they are shown in my prior Patent 2,634,840. Both of the ring gears 23 and 24 imparting drive to the knotter mechanisms are mounted on a shaft 35 which is carried at its outer ends in spaced bearing means 30 and 36 which in turn are integral with the supporting structure 26. The shaft 35 is disposed within a central aperture 37 within the driven sleeve shaft 29. It is thus apparent that the driving and driven shafts are thus concentric one with the other and, further, that the drive from the outer shaft imparts drive to the inner shaft at a time when the clutch parts 33 and 34 are arranged for joint movement.

As shown in my prior patent, there is provided a means for effecting clutch operation at a time when sufficient hay has been compacted within the bale forming chamber 13 to produce a desirable length hay bale. Control of the length of hay bales is the important feature in the present application. It has been a common expedient to employ a star or pronged wheel 38 which will engage the compacted hay and be rotated by longitudinal movement of that hay through the bale forming chamber. The star wheel 38 as shown in Figures 2 and 3 is mounted on a vertically disposed shaft 39 which is journaled for rotation within a bearing 40 formed as an integral part of the frame supporting structure 26. The star wheel 38 is disposed substantially horizontally with its radially disposed prongs or star points passing through an aperture 41 within a vertical side wall 42 of the bale forming chamber 13. As shown in Figure 2 the prong-like radial projections 43 of the star wheel 38 are geographically positioned within the bale forming chamber 13 and thus movement of hay in a longitudinal direction through the bale forming chamber will cause a rotation of the star wheel 38, which in turn imparts rotation to the vertically journaled shaft 39. A bevel gear 44 is fastened to the star wheel shaft 39 by means of a pin or the like 45. This bevel gear 44 is in driving relationship with a vertically disposed bevel gear 46 which is affixed to a horizontally disposed shaft 47 journally mounted in a bearing member 48. The bearing member 48 is fixedly mounted on and forms a part of the main frame supporting structure 26 of the hay baler of this invention.

The function of the hay engaging star wheel 38 is to measure the length of bales made by the machine of this invention. This is true of most of the star wheels employed in hay baling implements. Thus revolution of the star wheel is constructed to actuate the clutch mechanism by means of an intermediate trip to thus cause the knotting mechanisms to commence operation and effect a tying and/or bundling of the bales of hay. The operation of this trip mechanism is identical to that employed in my prior Patent 2,634,840. As best shown in Figure 4, the shaft 47 rotated by the star wheel 38 through the medium of the engaging bevel gears 44 and 46 has mounted thereon a hub member 49. The hub 49 is affixed to the shaft 47 by means of a pin or the like 50. The hub 49 includes a threaded aperture 51 in order that a trip finger drive spring 52 may be attached thereto by means of a screw or the like 53. The attaching screw 53 engages the threaded aperture 51. A member 54 is journally mounted over the shaft 47 and may have rotation without concurrent rotation of the shaft or vice versa. The member 54 has a central portion 55 as shown in Figure 2 for the journal mounting over the shaft 47. The member 54 includes a laterally projecting annular flange 55, as shown in Figures 2 and 4, the internal annular surface of which is equipped with a ring of ratchet teeth 56. Thus although there is no direct fastening means between the element 54 and the drive shaft 47 from the star wheel 38, the rotatable movement from the shaft is delivered to the member 54 through the engagement of the trip finger drive spring 52 with the internal ratchet teeth 56 on the member 54 as best shown in Figure 4. It will be apparent that as the star wheel 38 is rotated by the longitudinal movement of hay through the bale forming chamber 13 the member 54 will be simultaneously rotated. For purposes of convenience and a clearer understanding of the operation of this invention, the ratchet teeth 56 shall be considered the first ratchet element on the member 54 and the trip finger drive spring 52 shall be considered the first pawl.

The rotatable member 54 has a trip finger 57 radially extending outwardly from the outer circumferential surface. This trip finger 57 is adapted to release a trip lever 58 which forms a part of the clutch member 31. The trip lever 58 is equipped with a horizontally disposed ledge 59 located within the path of travel of the trip finger 57 and adapted to be engaged thereby. The other end of the trip lever 58 is hingedly mounted at 60 on a trip release cam arm 61 which is pivotally mounted at 62 on the frame supporting structure 26 for vertical oscillatory movement. The upper end of the trip release cam arm 61 has a roller member 63 journaled thereon and adapted to engage a cam track or surface 64 on the clutch member 31. The cam track as shown is irregular in shape and in the cooperative position of Figure 4 the roller 63 of the arm 61 is disposed within a depression 65 thereof. When the trip lever is released by the trip finger 57 from the clutch member 31 and the cam track 64 is rotated concurrently with the operation of the knotting mechanisms, the trip release cam arm will be oscillated about its hinge 62 with its initial movement being outwardly away from the bale length measuring mechanism.

The present invention, as stated in the objects above, is concerned with the minimizing of the bale length variation. Assume for example the trip finger 57 has engaged the ledge 59 of the trip lever 58 but the lever 58 has not yet released the clutch 31 for its rotatable operation. Thus it is necessary to feed another charge of hay to the bale forming chamber 13 in order to continue rotational movement of the star wheel 38 to effect further movement of the trip finger 57 to thus release the trip lever 58. Perhaps only a small amount of hay is necessary to cause this final releasing of the trip lever. However, there is no means for regulating the size of this last charge of hay as this size is entirely dependent upon the size of the windrow or the bunches of hay as they are disposed within the field. In the event the windrow is large, the last charge of hay necessary to rotate the trip finger the final two or three degrees of movement causes the bale being formed to be an unusually long bale, whereas if the windrow were relatively small the last charge would similarly be smaller yet sufficient to set off the knotting mechanism resulting in a substantially standard length bale. Considering further when the last charge is a large one and there was only required a small amount of movement of the trip finger to cause release of the trip lever, the trip finger will without the aid of the present invention continue its arcuate movement around the shaft 47 as a center even though the new bale has not yet been started to be formed. It will thus be seen that the trip finger 57 need only be rotated some amount less than a full revolution in order to cause a tripping for the next operation of the knotting mechanisms. It follows that the bale succeeding a relatively long bale in present day machines will thus be relatively short. The present invention is expressly for the purpose of avoiding this great discrepancy in the length of bales as they are formed in the baling machine of this invention.

A trip finger auxiliary drive rod or link 66 is joined to the trip release cam arm 61 at the same pivotal connection 60 where the trip lever 58 joins the arm 61. The other end of the link arm 66 is pivotally joined at 67 on a trip finger auxiliary drive member 68 as best shown in Figure 5. The member 68 is journaled for free rotation about the shaft 47. A relatively flat leaf spring 69 is riveted or otherwise fastened as at 70 to the surface of the member 68. The spring 69 assumes a relatively spiral shape, as shown in Figure 2, and is adapted to ride on an annular flat surface 71 on the back side of the trip finger member 54. The back side of this member includes a single ratchet tooth 72 which is shown in detail in Figures 5 and 6. The single tooth includes a substantially vertically disposed wall 73 at one end thereof and a gradually inclined surface 74 as the other wall thereof. The outer end of the flat spiral-shaped spring 69 shown at 75 in Figure 5 may slide downwardly within the single ratchet tooth 72 and engage the vertical end 73 to cause movement of the trip finger element 54 in the direction of the arrow 76, whereas reverse movement of the spring 69 caused by oscillation of the member 68 merely results in the end of the spring 75 riding upwardly over the inclined surface 74.

In operation the function of the star wheel is identical to that shown in my prior Patent 2,634,840 wherein the pawl member 52 causes the driving of the element 54 by engagement of the ratchet teeth 56. Rotation of this trip finger member 54 occurs in the direction as shown by the arrow 77 in Figure 4. If the device were to be reversed, the pawl 52 would merely ratchet or slip over the ratchet teeth 56 whereupon the elements would not have concurrent drive. The releasing of the trip lever 58 by the trip finger 57 permits the clutch member 31 to be rotated in the direction of the arrow 78 in Figure 4. This immediately permits the irregular cam surface 64 to cause the trip release cam arm 61 to oscillate back and forth about its hinge 62. The link 66 thus moves in the direction of the arrows 79 and 80 as shown in Figure 5. The trip finger auxiliary drive element 68 will thus be oscillated about the shaft 47 causing the flat spring 69 to ride into the single ratchet tooth 72 on the rotatable member 54. The purpose of the device of this invention is to index the trip finger 57 to a position considerably beyond the normal terminus of the trip finger occasioned by the movement of the star wheel. Thus if there is just sufficient hay put into the bale forming chamber to cause tripping of the clutch release lever 58 the spring pawl 69 will further advance the trip finger a substantial distance to its uniform starting point. When a trip finger rotor 54 is rotated by the second pawl 69 it will automatically ratchet or slip over the first spring pawl 52. If the trip finger 57 has been moved beyond its normal terminating position by reason of an excessive last charge or slice of hay, the single tooth 72 will be positioned at a substantial distance from the spring 69, whereupon only the last part of the movement of the link 66 will cause the spring 69 to engage the ratchet tooth 72 and cause movement of the trip finger element 54 in the direction 76 so the finger 57 comes to rest in its uniform starting position regardless of the size of the last charge of hay. The trip finger rotor is constantly rotated in the same direction of rotation by both the pawls 52 and 69. Again for purposes of convenience, the spring 69 shall be known as the second pawl element and the ratchet tooth 72 shall be referred to as the second ratchet means on the trip finger element 54. The ratchet means 56 and 72 are axially spaced apart about shaft 47 on the element 54 and operate in the same direction of rotation such that in normal movement of the trip finger 57 by reason of rotation of the star wheel 38, the pawl 69 will ratchet or slip over the second ratchet means 72 without effect. Similarly when the pawl 69 is actuated by oscillation of the link arm 66 and more particularly in the direction 80 and engages the wall 73 of the single ratchet tooth 72 for concurrent movement of the member 68 and trip arm element 54, the regular driving pawl 52 will slip over the ratchet teeth 56 of the first ratchet means.

The cam track 64 effects oscillation of the pivoted arm 61 and this oscillation is imparted to the trip finger auxiliary drive element 68 as shown in Figure 5. Thus whenever the knotting mechanism is in operation the trip finger auxiliary drive is oscillating and providing for constant engagement of the second ratchet means by the second pawl element in order that the starting position of the trip finger 57 be constantly readjusted to a zero starting point at the commencement of formation of a new bale of hay. It will be apparent that herein is provided a means for minimizing the discrepancy in the length of hay bales and such length uniformity is very desirable for many reasons which include easier storage, handling and shipment and a more uniform product whether for use on the immediate farm or for sale to the public.

Numerous details of construction may be varied throughout a wide range without departing from the principles disclosed herein and I, therefore, do not propose limiting the patent granted hereon otherwise than as necessitated by the appended claim.

What is claimed is:

A trip mechanism comprising a supporting structure, a shaft journally mounted in said supporting structure, means rotating said shaft, a rotatable trip element journally mounted on said shaft, a first ratchet means on said rotatable trip element, said first ratchet means including a complete annular internal ring member, pawl means affixed to said shaft and adapted to engage said first ratchet means and cause rotation of said rotatable trip element, a second ratchet means on said rotatable trip element, said second ratchet means including an axially spaced-apart radially disposed flat surface, a second pawl element journally mounted for free movement on said shaft, said second pawl element adapted to engage said second ratchet means, and means separate from the means rotating said shaft for moving said second pawl element around the shaft to cause a rotation of said second ratchet means, said first and second pawls arranged and constructed to overrun when drive is received from the other, whereby the trip element may be indexed.

References Cited in the file of this patent

UNITED STATES PATENTS

| | | |
|---|---|---|
| 188,562 | Adriance | Mar. 30, 1877 |
| 222,689 | Garver | Dec. 16, 1879 |
| 467,396 | Burgis | Jan. 19, 1892 |
| 1,001,277 | Johnson | Aug. 22, 1911 |
| 2,552,246 | Wilckens et al. | May 8, 1951 |
| 2,634,840 | Birnzin | Apr. 14, 1953 |